March 15, 1960
E. RIETSCH
2,928,923
PROCESS AND DEVICE FOR INDUCTION HEATING OF THE END
FACES OF WORKPIECES TO BE WELDED TOGETHER
Filed May 18, 1959
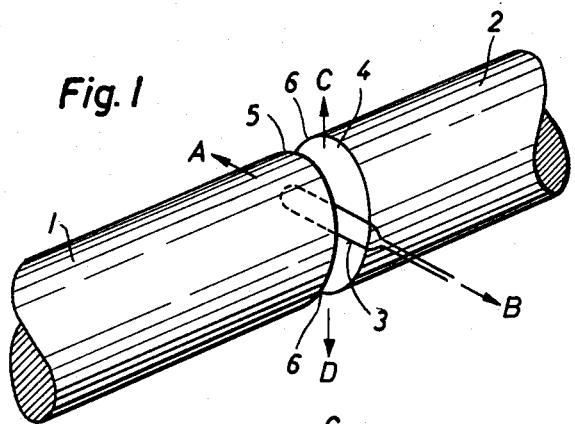
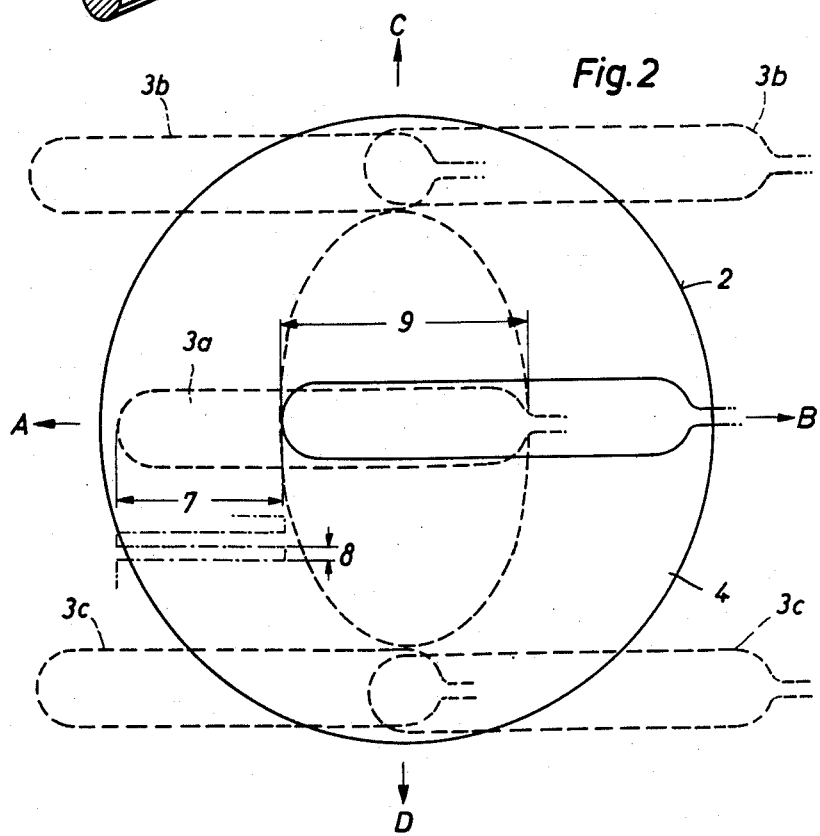
INVENTOR
Eberhard Rietsch
BY
Lowry + Rinehart
ATTYS.

United States Patent Office 2,928,923
Patented Mar. 15, 1960

2,928,923

PROCESS AND DEVICE FOR INDUCTION HEATING OF THE END FACES OF WORKPIECES TO BE WELDED TOGETHER

Eberhard Rietsch, Mulheim (Ruhr), Germany, assignor to Theodor Wuppermann G.m.b.H., Leverkusen, Germany Application May 18, 1959, Serial No. 814,030

Claims priority, application Germany May 22, 1958

11 Claims. (Cl. 219—9.5)

This invention relates to a process and a device for induction heating of the end faces of workpieces to be butt-welded.

The butt-welding of workpiece parts by the resistance flash butt-welding process is known. In this process, the parts to be welded may be preheated in the machine by the flow of current. It is also known to effect the preheating of such parts by induction using inductors inserted between the end faces and subsequently completing the weld by the resistance flash butt-welding process after having removed the inductors.

Preheating with an inductor inserted into the weld gap still offers difficulties of achieving uniform heating of the end faces by induction. When considering a welded joint made by the conventional resistance flash butt-welding process in a longitudinal section, i.e. parallel to the workpiece axis, it becomes apparent that the zone influenced by the welding heat is wider at the margins of the workpiece than in the center. This is due to the fact that the temperature was not uniformly distributed throughout the end face but was higher towards the margins of the end face. This phenomenon is attributed to the skin effect occurring in case of alternating current. While a certain influence of this effect will certainly exist, the influences of the purely mechanical dissipation of heat into the rest of the workpiece seem likewise to play a part. Both of these influences have the effect that the core of the workpiece is cooler at the end face than at the outer zone. This phenomenon becomes the more perceptible if the flash butt-welding is combined with preheating by induction which is preferably effected at a higher frequency. Due to the increased skin effect thereby caused, the temperature of the center of the cross-sectional area will lag still more behind that of the marginal parts.

Many efforts were made to achieve uniformity of temperature throughout the cross-sectional area by applying various measures. One of these measures which were proposed involves the use of an inductor coil of elliptic shape, the two axes of which are not greater than the end face to be heated and which is imparted an oscillating motion in the direction of its smaller axis. To achieve uniform heating in this procedure, the cooperation of a large additional coil embracing the whole workpiece is required, this coil heating each time that side of the workpiece which is not covered by the small elliptic coil. This makes the device complicated and undesirably bulky in the area of the weld gap. Uniform heating as aimed at by this proposal is not even obtained directly but approximately only when considering the natural equalization of heat.

The invention provides the possibility, despite the use of preheating by induction at a medium frequency with its increased skin effect, to obtain not only uniform heating throughout the end face of the workpiece but even to counteract the non-uniform heating in the subsequent burning-down, i.e. to conduct the heating such that the core of the workpiece is preheated to a greater extent.

The invention is characterized in that the inductor conducted in a plane parallel to the end faces to be heated is moved with oscillations and with variable lengths of path and velocities in two directions at the same time, said directions being preferably at an angle of 90° with respect to each other. The oscillating movements of the inductor in a predetermined direction and/or a further direction transversely thereto, e.g. in the direction of the width and height of the cross-sectional area of the workpiece, should be maintained in a range such that the inductor deflections remain overlapped. These deflections during the oscillation are advantageously kept shorter in the core range of the end face of the workpiece than at the marginal zone of this face. Moreover, the oscillating motions in the one and/or other direction may be controlled by such mechanical means that the inductor moves slower in the center of the end face than at the end.

The design of the inductor for the movements in accordance with the invention is advantageously such that the inductor loop has an elongated shape with the legs preferably extending parallel to each other.

In this manner, heating of the end faces of the workpieces to be welded can be accomplished such that the phenomena of the skin effect and also of heat accumulation at the marginal zones are counteracted so efficiently that the core of the parts to be welded is safely and dependably heated not only to the same but even to a greater extent than the marginal zones.

In accordance with a further feature of the invention a control of the heating by means of the inductor voltage may be effected in addition to or in place of the measures described above. Thus, the excitation of the medium frequency generator feeding the inductor may be controlled in dependence upon the spatial position of the inductor above the cross-sectional area, this control being such that the generator voltage is lowered as the inductor sweeps over the marginal zones and is increased as the inductor sweeps over the core area. In this manner, the heating may likewise be concentrated to the core range of the cross-sectional area. At the same time, an infinitely variable or delicately stepped regulation may be effected. It is preferable to combine the controlled inductor movement described above with the controlled inductor voltage.

The process of the invention is carried out by the apparatus shown in the accompanying drawing, wherein:

Fig. 1 is a perspective view of the overall arrangement, and

Fig. 2 is an elevational view of an end face of a workpiece illustrating the potential motions of the inductor provided in accordance with the invention.

The workpieces 1 and 2 to be welded are positioned for preheating of the end faces 4 and 5 by means of an inductor 3 and for welding by the resistance flash butt-welding process. The parts 1 and 2 are fixed for this purpose in the chuck jaws (not shown) of a welding machine. Between the parts is a gap 6 in which the loop-shaped inductor 3 is capable of moving freely in a plane parallel to the end faces of the workpieces 1 and 2 as shown in Fig. 2.

In accordance with the invention, the inductor loop 3 has an elongated shape, it being possible for the legs of the loop to extend parallel with respect to each other.

Moreover, during the preheating operation, the inductor is imparted an oscillatory or reciprocating motion in a direction A—B as shown by dotted lines 3ª and the inductor thus moved with oscillations may simultaneously be moved up and down in a transverse direction C—D which is preferably at an angle of 90° with respect to the first-mentioned motion as at 3ᵇ and 3ᶜ. The latter motion is preferably effected at a velocity which is lower than that of the reciprocating movement in the direction A—B. The result of such movements is that every point of the inductor loop performs a wide deflection 7 in the one direction, e.g. the direction A—B, and thereafter a short deflection 8 in the direction transverse thereto, i.e. in the direction C—D. This is again followed by the wide deflection in the direction A—B as the inductor moves back. At the end of this deflection or while it is performed, the short deflection in the transverse direction 8 takes place. The wide deflection in the direction A—B should be shorter than the length of the inductor loop. This results each time in an overlapped range 9 so that the inductor action is always existing within this range of the cross-sectional area. In order to intensify the action of the inductor on the core range of the cross-sectional area, the movement of the inductor in vertical direction C—D may be effected such that it is slower in front of the end face core than at the respective marginal zones. Furthermore, the short deflections in vertical direction may be made to become continuously or intermittently longer in the range of the upper and lower marginal zones. Each of the measures alone and, even to an increased extent, both of the measures result in an overlapped range of the inductor motions or a range of action which may take the form of a wide oval surface 10. This provides the possibility of compensating the electrical and natural phenomena of heat dissipation in the core area or of heat accumulation at the marginal zones due to the skin effect.

In the diagrammatic representation of Fig. 2, the extreme positions of the inductor 3 are indicated by dashed lines by way of example at 3ª, 3ᵇ and 3ᶜ. The preheating for the flash butt-welding operation, i.e. with more intense heating of the core area, may be obtained due to the fact that the inductor moved with oscillations or reciprocations in the direction A—B covers the marginal zones only temporarily while the center is constantly covered. If it is not intended to extend the long deflections 7 in the transverse direction as the inductor reaches the marginal zones, a less intense heating of the marginal zones can be obtained either by accelerating the movement in the transverse direction C—D, i.e. by increasing the height of lift 8 in this direction, and/or by decreasing the inductor voltage. The latter measure is of particular advantage. All of the measures may be effected with an infinite or delicately stepped transition between the mid-position and the upper and lower extreme positions. This permits the adjustment or determination of a core range of the cross-sectional area wherein the preheating by induction is of higher efficiency and equalizes the dissipation of heat in outward direction.

I claim:

1. A process for heating by induction the end faces of workpiece parts to be subsequently butt-welded by the resistance flash butt-welding process, wherein the inductor loop is moved in the weld gap in a plane parallel to the end faces to be heated, said process comprising the step of moving the inductor loop simultaneously in two directions which are preferably at an angle of 90° while performing oscillations of different lengths and velocities and keeping the oscillatory motions of the inductor in a range of overlapping of inductor motions on a predetermined length and height of the cross-sectional areas of the workpieces.

2. The process of claim 1, wherein the excitation of the medium frequency generator feeding the inductor is controlled in dependence of the spatial position of the inductor, said control being such that the generator voltage is lowered as the inductor sweeps over the marginal zones and is increased as the inductor sweeps over the core range.

3. The process of claim 1, wherein the short deflections of the oscillating motions of the inductor are shorter in the core range of the workpiece face than at the marginal zone of said face and the deflections in the direction of the longitudinal axis of the inductor are shorter than the inductor length.

4. The process of claim 1, wherein the oscillating motions in all directions are controlled so that the movement of the inductor is slower in the core range of the end face than at the marginal part.

5. The process of claim 2, wherein the oscillating motions in all directions are controlled so that the movement of the inductor is slower in the core range of the end face than at the marginal part.

6. The process of claim 3, wherein the oscillating motions in all directions are controlled so that the movement of the inductor is slower in the core range of the end face than at the marginal part.

7. The process of claim 1, wherein said controlled movement of the inductor is applied together with the control of inductor voltage for increasing the preheating of the core range.

8. The process of claim 2, wherein said controlled movement of the inductor is applied together with the control of inductor voltage for increasing the preheating of the core range.

9. The process of claim 3, wherein said controlled movement if the inductor is applied together with the control of inductor voltage for increasing the preheating of the core range.

10. The process of claim 4, wherein said controlled movement of the inductor is applied together with the control of inductor voltage for increasing the preheating of the core range.

11. A device for carrying out the process of claim 1, characterized in that the inductor loop is of elongated shape having preferably legs extending parallel to each other.

References Cited in the file of this patent

UNITED STATES PATENTS 2,448,009    Baker  ---------------- Aug. 31, 1948